United States Patent
Inoue et al.

(10) Patent No.: US 7,538,148 B2
(45) Date of Patent: May 26, 2009

(54) AQUEOUS INK COMPOSITION

(75) Inventors: Hiroshi Inoue, Osaka (JP); Norimasa Kurihara, Osaka (JP); Shoko Matsumoto, Tokyo (JP); Kyoko Sano, Osaka (JP); Takeshi Omatsu, Osaka (JP); Shigeki Yoneda, Osaka (JP); Yasunori Nakatani, Osaka (JP); Hiroyoshi Yamamoto, Osaka (JP); Kozaburo Fujita, Osaka (JP)

(73) Assignee: Sakura Color Products Corporation, Osaka-shi (JP)

( * ) Notice: Subject to any disclaimer, the term of this patent is extended or adjusted under 35 U.S.C. 154(b) by 498 days.

(21) Appl. No.: 10/558,458

(22) PCT Filed: May 26, 2004

(86) PCT No.: PCT/JP2004/007551

§ 371 (c)(1),
(2), (4) Date: Nov. 28, 2005

(87) PCT Pub. No.: WO2004/106445

PCT Pub. Date: Dec. 9, 2004

(65) Prior Publication Data

US 2006/0233595 A1    Oct. 19, 2006

(30) Foreign Application Priority Data

| May 27, 2003 | (JP) | ............................. 2003-149491 |
| May 27, 2003 | (JP) | ............................. 2003-149512 |
| May 27, 2003 | (JP) | ............................. 2003-149640 |

(51) Int. Cl.
*C09D 11/00*    (2006.01)
*B43M 11/02*    (2006.01)

(52) U.S. Cl. ........................................ 523/160; 401/219
(58) Field of Classification Search ...................... None
See application file for complete search history.

(56) References Cited

U.S. PATENT DOCUMENTS

| 5,880,214 | A  * | 3/1999  | Okuda ......................... 524/801 |
| 5,889,085 | A    | 3/1999  | Fukuda et al. |
| 6,299,376 | B1 * | 10/2001 | Nakatani ...................... 401/215 |
| 6,325,845 | B1 * | 12/2001 | Kurihara et al. .......... 106/31.68 |
| 6,406,204 | B1 * | 6/2002  | Omatsu et al. .............. 401/142 |
| 6,492,451 | B1 * | 12/2002 | Dersch et al. ............... 524/430 |
| 6,706,099 | B2 * | 3/2004  | Sir et al. ................... 106/31.02 |

(Continued)

FOREIGN PATENT DOCUMENTS

JP    63-273673    11/1988

(Continued)

*Primary Examiner*—David Wu
*Assistant Examiner*—Vu Nguyen
(74) *Attorney, Agent, or Firm*—Hamre, Schumann, Mueller & Larson, P.C.

(57) ABSTRACT

The ink of the present invention comprises at least a three-dimensional film-forming component and water, comprises an adhesive synthetic resin emulsion as said three-dimensional film-forming component, and comprises at least 30% by weight of said adhesive synthetic resin emulsion on the basis of the solid content with respect to the total amount of the ink, and minimum film-forming temperature (MFT) of said adhesive synthetic resin emulsion is not greater than 25° C. and further, said ink comprises 1 to 3% by weight of a film-forming assistant with respect to the total amount of the ink.

18 Claims, 8 Drawing Sheets

U.S. PATENT DOCUMENTS

| | | | |
|---|---|---|---|
| 2001/0017096 A1* | 8/2001 | Miyamoto et al. | 106/31.58 |
| 2003/0005855 A1* | 1/2003 | Miyamoto et al. | 106/31.13 |
| 2003/0076395 A1* | 4/2003 | Onishi et al. | 347/101 |
| 2003/0089271 A1* | 5/2003 | Hirano et al. | 106/31.9 |

FOREIGN PATENT DOCUMENTS

| | | | |
|---|---|---|---|
| JP | 06-073323 | | 3/1994 |
| JP | 06-220382 | | 8/1994 |
| JP | 10-017801 | | 1/1998 |
| JP | 2001-002973 | | 1/2001 |
| JP | 2001-19888 A | | 1/2001 |
| JP | 2001-341484 | | 12/2001 |
| JP | 2001341484 A | * | 12/2001 |
| JP | 2003-127582 | | 5/2003 |
| JP | 2004-181669 | | 7/2004 |

* cited by examiner

AQUEOUS INK COMPOSITION

FIELD OF THE INVENTION

The present invention relates to an aqueous ink composition capable of forming a rising three-dimensional handwriting and to a writing instrument in which said ink is included.

BACKGROUND OF THE INVENTION

Conventionally, three-dimensional inks have been provided which include a binder, a colorant, and a lightweight filler (page 1 of Japan Unexamined Patent Publication Sho 63-273672).

It is stated that by this, three-dimensional characters, figures, and the like can be obtained since a lightweight fine powdery filler is taken in a film formed by a binder at the same time of writing (page 4, lines 12 to 15, lower right column of said patent document).

However, in the ink disclosed by said patent document, a three-dimensional handwriting is formed using a lightweight fine powdery filler and hardening it by a binder, which means that a lightweight fine powdery filler acts as so-called a three-dimensional film-forming component.

The object of the present invention is to provide an aqueous ink composition capable of forming a satisfactorily rising three-dimensional handwriting without compounding a lightweight fine powdery filler.

SUMMARY OF THE INVENTION

As a result of intensive studies for achieving the above object, the present invention has employed an aqueous ink composition comprising at least a three-dimensional film-forming component and water, comprising an adhesive synthetic resin emulsion as said three-dimensional film-forming component, and comprising at least 30% by weight of said adhesive synthetic resin emulsion on the basis of the solid content. By the ink for writing instruments of the present invention, without compounding a lightweight fine powdery filler, satisfactorily rising three-dimensional handwriting can be obtained.

DETAILED DESCRIPTION OF THE EMBODIMENTS

Figure 1:
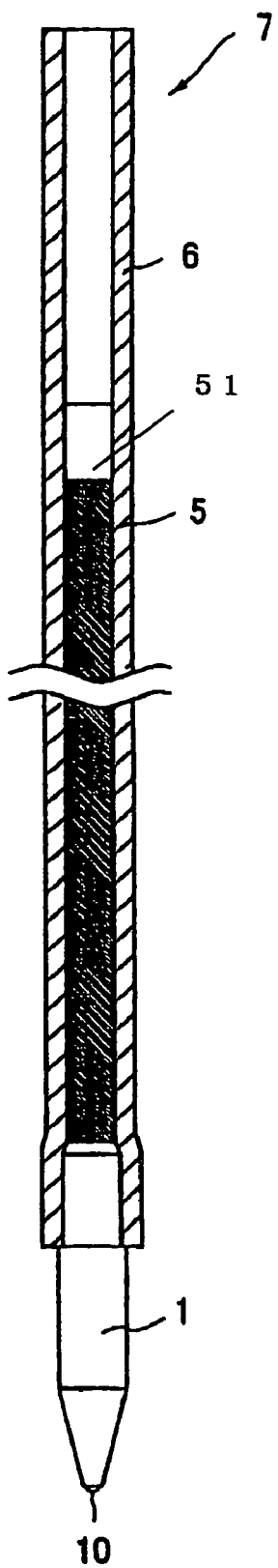
FIG. 1 is a cross-section of a lead using one embodiment of a ball-point pen tip unit related to a writing instrument of the present invention.

Said resin emulsion used in an ink of the present invention is preferably contained in at least 30% by weight on the basis of the solid content as a three dimensional film-forming component in the ink. Further, a resin emulsion is particularly preferably contained in at least 35% by weight, and further preferably contained in at least 37% by weight, and most suitably contained in at least 40% by weight. In addition, as a maximum content, said resin emulsion is preferably contained in 75% by weight, and further preferably contained in 55% by weight. When said resin emulsion is contained in less than 30% by weight on the basis of the solid content in the ink, a solid content is so little that rise of a handwriting lowers and a satisfactorily three-dimensional handwriting film is hard to obtain. On the other hand, when said resin emulsion is contained in more than 75% by weight on the basis of the solid content in the ink, there are so many resin particles present that stability with time of an ink deteriorates.

Said adhesive synthetic resin emulsion is preferably such a synthetic resin emulsion whose minimum film-forming temperature (MFT) is not greater than 25° C. In addition, as said adhesive synthetic resin emulsion, such one can be used that includes a synthetic resin emulsion whose minimum film-forming temperature (MFT) is not greater than 5° C. and synthetic resin emulsion whose minimum film-forming temperature (MFT) is not less than 50° C., thereby having minimum film-forming temperature (MFT) of not greater than 25° C. In the above mentioned two kinds of emulsions, it is desirable that a mixture ratio of adhesive synthetic resin emulsion whose minimum film-forming temperature (MFT) is not less than 50° C. to an adhesive synthetic resin emulsion whose minimum film-forming temperature (MFT) is not greater than 5° C. is 1/4 to 4/1. When said mixture ratio is less than 1/4, tack is generated on a written line and when written on a note book and the like, there lies a problem that a written line adheres to a next paper to be written on. Further, when said mixture ratio exceeds 4/1, satisfactory gloss cannot be obtained.

In addition, resin particles of said emulsion can be made up of a resin particle group which is composed of plural of resin particle groups with different average particle diameters respectively, said resin particle group having plural of resin particle size distributions. And by composing of resin particle groups with different average particle diameters and with plural of particle size distributions, a three-dimensional handwriting by resin particle groups can be secured by resin particle groups with a large average particle diameter, and ink fluidity can be secured by resin particle groups with a small average particle diameter, thereby capable of obtaining a three-dimensional handwriting with a stable shape as a whole. To be specific, among the above mentioned plural of resin particle groups, an average particle diameter of said resin particle groups with minimum average particle diameter is preferably within the range of 0.07 to 0.3 μm and an average particle diameter of said resin particle groups with maximum average particle diameters is preferably within the range of 0.3 to 1.0 μm.

As said resin emulsion, to be specific, an acrylic resin emulsion, a styrene acrylic resin emulsion, an alkyd resin emulsion, and an urethane resin emulsion can be exemplified. To be specific, as acrylic resin emulsions, trade names Nikazol FX138Y (manufactured by NIPPON CARBIDE INDUSTRIES CO., LTD.), Nikazol RX242A (manufactured by NIPPON CARBIDE INDUSTRIES CO., LTD.), Mowinyl 792 (manufactured by CLARIANT POLYMER CO., LTD.) can be exemplified, and as styrene acrylic resin emulsions, trade names BONKOTE NST 100 (manufactured by NIPPON CARBIDE INDUSTRIES CO., LTD.) and Mowinyl 972 (manufactured by CLARIANT POLYMER CO., LTD.) can be exemplified, and as alkyd resin emulsions, tradename Watersol CD 520 (manufactured by DAINIPPON INK AND CHEMICALS, INCORPORATED) can be exemplified, and as urethane resin emulsions, trade name SUPERFLEX 500 (manufactured by DAIICHI KOGYO SEIYAKU CO., LTD.) can be exemplified.

In addition, these emulsions can be used in mixture of two or more.

In the present invention, in addition to a resin emulsion which is said film-forming component, a film-forming assistant can further be used. The film-forming assistant is defined as a substance having a property of plasticizing a film-forming resin of said resin emulsion. Further, it is important that said film-forming assistant has a property of imparting puffy volume to a three-dimensional hand writing formed by a film-forming resin of said resin emulsion and of flattening surfaces of a three-dimensional surface and of lowering minimum film-forming temperature of said resin emulsion. As a film-forming assistant having such a property, to be specific, texanol, butyl cellosolve, carbitol, butylcarbitol acetate, dibutylphthalate, and the like can be exemplified. Among them, texanol and butyl cellosolve are preferable. The content of a film-forming assistant with respect to the total amount of the ink is preferably 0.01 to 3% by weight, and most suitably, 0.1 to 1.5% by weight. When the content of a film-forming assistant is less than 0.01% by weight with respect to the total amount of the ink, satisfactory plasticizing effect is not obtained and therefore, a rise feeling and gloss lower. On the other hand, when the content of a film-forming assistant exceeds 3% by weight with respect to the total amount of the ink, the ink soaks in paper, and therefore, further rise effect of handwritings lowers.

In the present invention, a colorant can be used. As a colorant used in the present invention, for example, other than a water-soluble dye such as an acid dye, a direct dye, a base dye, and the like, an inorganic pigment such as carbon black, titanium oxide, silica of alumina, talc, and the like, anorganic pigment such as azo pigment, naphthol pigment, phthalocyanine pigment, threne pigment, quinacridone pigment, anthraquinone pigment, dioxane pigment, dioxadine pigment, indigo pigment, thioindigo pigment, perinone pigment, perylene pigment, indolenone pigment, azomethine pigment, metal powder pigment such as aluminum powder pigment, bronze powder pigment, and the like, fluorescent pigment, pearlescent pigment, glittering pigment and the like can be exemplified. In addition, these pigments can be used in pigment dispersions. Further, aplastic pigment (a synthetic resin particle pigment) with various shapes such as spherical shapes, flat shapes, hollow shapes, and the like, can be used. For example, in the present invention, it is preferable to use them in resin powders of not greater than 100 µm or resin powders of not greater than 100 µm dispersed in water. The above mentioned resin powder can be used as a colored resin emulsion colored with pigments•dyes.

As the above mentioned glittering pigment, for example, a metal coated glass flake pigment, a metal coated inorganic pigment, a metal oxide coated inorganic pigment, a metal powder pigment such as an aluminum powder pigment and the like, a metal foil, a film deposited by a metal, a metal-vapor deposition membrane (for example, a metal-vapor deposition membrane obtained by peeling off a vapor-deposited metal layer on a film), and the like can be exemplified. Here, a metal glass flake pigment is defined as a pigment composed of a structure in which a flaky glass is coated with a metal (alloy). Further, a metal coated inorganic pigment is defined as a generic term of an inorganic pigment coated with a metal (alloy). An inorganic pigment coated with metal oxide (for example, metal pigment such as aluminum pigment coated with metal oxide) can also be used.

In addition, various kinds of opacifying pigments such as inorganic pigments or organic white pigments including titanium oxide, alkylene bismelamine derivatives, plastic pigments (synthetic resin particle pigments) with various shapes such as spherical, flat, and the like can be used alone or in combinations.

Further, as already mentioned, the colorant can be used as a pigment dispersion in which a colorant not restricted to said plastic pigment (synthetic resin particle pigment) is dispersed in water.

A colorant used in the present invention is preferably contained in 0.01 to 20% by weight, preferably not less than 0.01 to less than 15% by weight, more preferably 0.01 to 10% by weight with respect to the total amount of the aqueous ink composition. When the content of the above mentioned colorant is less than 0.01% by weight with respect to the total amount of the aqueous ink composition, coloring of said colorant is hard to be recognized by visual observation. When the content of the colorant exceeds 20% by weight with respect to the total amount of the abovementioned aqueous ink composition, viscosity gets so high that fluidity lowers.

In the ink of the present invention, perfume can be included. By including perfume, a three-dimensional hand writing film can be formed in which scent of perfume can be maintained by discharging scent three-dimensionally. In particular, when perfume is a general oily perfume, since perfume is not mixed with water in a normal condition, the content to be added should be reduced or a solvent should be added when used in an aqueous state, however, when the above mentioned perfume is included in the ink composition of the present invention, since said composition includes the above mentioned adhesive synthetic resin emulsion, a resin particle of said adhesive synthetic resin emulsion present as the emulsion can take in said perfume, thereby capable of preparing an aqueous ink composition including a resin particle of said adhesive synthetic resin emulsion with said perfume taken in. By this, despite an aqueous ink composition, perfume which is an oil content does not separate and therefore, the scent of perfume can be practically maintained discharging scent from a three-dimensional handwriting film, and further, since a plenty of perfumes can be included, a three-dimensional hand writing film which can sustain scent of perfume and control strength of perfume can be formed.

As preferable perfume which can be used in the present invention, Plum NS-D5972, Cherry blossom NS-D5973, Chrysanthemum NS-D5974, Chinese bell flower NS-D5975, Wisteria NS-D596, Perfume NS-D5882 (mint), Perfume NS-D5929 (musk), Grapefruit NS-F5239, Strawberry NS-F5240, Lemon NS-G5883, Ultramarine NS-G5885, Peppermint NS-F5241, Peach NS-F5242, Orange NS-F5243, Green Apple NS-F5244, Blueberry NS-F5245, Lavender NS-F5246, Vanilla NS-F5247, Banana NS-F5248, Soap (scent of soap) NS-F5249, Perfume NS-F5210, Jasmin NS-D5812, Plum NS-D5972, Citrus NS-D5499, Rose NS-E5798, Lavender NS-E5442, Rose NS-E5443, Mint NS-E5444, Hinoki NS-D5015, Fragrance NS-G5000, Fragrance NS-G5001, Fragrance NS-G5002, Fragrance NS-G5003, Fragrance NS-G5004, Fragrance NS-G5005, Fragrance NS-G5006, Fragrance NS-F5992, Fragrance NS-F5993, Fragrance NS-F5994, Fragrance AN NS-G5253, Fragrance RS NS-G5254, Fragrance EV NS-G5255, Fragrance BL NS-G5256, Fragrance EP NS-G5257, Fragrance LR NS-G5258, Fragrance MR NS-G5259, Fragrance HP NS-G5260, Fragrance SW NS-G5261, and the like are exemplified.

It is preferable that these perfumes are so included that the weight ratio of the solid content of said adhesive synthetic resin and said perfumes is 2:1 to 40:1 in order that perfumes are preferably taken in a resin particle of emulsion and that preferable fragrance of perfumes are kept.

In the ink of the present invention, water is included. It is preferable that water is contained in 20 to 80% by weight with respect to the total amount of the ink composition.

Further, in the ink of the present invention, a water-soluble organic solvent, a surfactant, an antiseptic mildew-proofing agent, a rust inhibitor, an anti-foaming agent, a thickening agent, and the like can be included. For information, the ink of the present invention is not limited to the ink which forms a glossy handwriting.

In addition, as the above mentioned thickening agent, water-soluble thickening agents, for example, microbial polysaccharide and derivative thereof is used. For example, pullulan, xanthan gum, welan gum, rhamsan gum, succinoglucan, dextran, and the like can be exemplified. Water-soluble plant polysaccharides and the derivatives thereof are also used. For example, taraganth gum, guar gum, tara gum, locust bean gum, gati gum, arabino garactan gum, gum Arabic, quince seed gum, pectin, starch, psyllium seed gum, pectin, carageenan, arginic acid, agar, and the like can be exemplified. Moreover, a water-soluble animal polysaccharide and derivative thereof are also used. For example, gelatin, casein, albumin, can be exemplified. Further, as a water-soluble thickening resin, salts (sodium salts, ammonium salts, and the like) of a water-soluble resin (an acrylic water-soluble resin, a styrene acrylic water-soluble resin, a styrene maleic water-soluble resin and the like), a water dispersed resin and the like can also be used. Among the above mentioned water-soluble thickening resin, microbial polysaccharide and derivative thereof can preferably be used. A water-soluble thickening resin can be used alone or in combination of one, two or more. By using the above mentioned thickening agent, viscosity can be adjusted. In addition, when a pigment which has a settlement property in the ink is included as a colorant, which includes a metal powder pigment such as a metal coated glass flake pigment, a metal coated inorganic pigment, a metal oxide coated inorganic pigment, an aluminum powder pigment, and the like, a pigment which includes metal such as a metal foil, a film with metal deposited, a metal deposited film and the like, settlement of such a pigment can be inhibited. The above mentioned thickening agent is preferably contained in 0.001 to 10% by weight with respect to the total amount of the ink and more preferably, 0.01 to 5% by weight. Further preferably, the content is not greater than 3% by weight and most suitably, not greater than 1% by weight, and it is preferable that viscosity is controlled to the degree that a three-dimensional handwriting can be formed.

To produce the ink of the present invention, publicly known methods commonly used in the ink field can be employed. In addition, depending on cases required, processes for removing a large particle such as filtering and the like may be added. For example, by putting all the materials and by stirring with a dissolver for 30 minutes, a desired ink can be obtained.

When the ink of the present invention is used for a writing instrument, it is desirable that flowage amount of the ink from the pen tip is at least 100 mg/10 m, that is, the flowage amount is not less than 100 mg when writing 10 (detailed conditions are as stated in the measurement method in the later mentioned Examples). Further, the flowage amount of the ink from the pen tip is most suitably not less than 150 mg/10 m. By making the flowage amount of the ink of the present invention from the pen tip at least 100 mg/10 m, a three-dimensional hand writing with a thickness of 20 to 50 μm and a smooth and glossy handwriting surface can be obtained. When the flowage amount of the ink of the present invention from the pen tip is less than 100 mg/10 m, a three-dimensional handwriting with a smooth and glossy handwriting surface is hard to obtain. Further, although the upper limit of the flowage amount of the ink from the pen tip is not limited, in order to obtain a preferable three-dimensional handwriting, it is desirable to set it not greater than 800 mg/10 m and further preferably not greater than 500 mg/10 m. In addition, when the flowage amount of the ink of the present invention from the pen tip exceeds 800 mg/10 m, it takes extreme time to dry and characters get crushed due to too thick a hand writing, which is not preferable for writing instruments such as ball-point pens and the like.

When obtaining such a preferable three-dimensional hand writing, ink viscosity is 5 to 500 mPa·s, preferably 5 to 100 mPa·s, more preferably 5 to 50 mPa·s, and most suitably less than 5 to 100 mPa·s. In addition, the viscosity of the ink of the present invention is a measured value measured under the condition of using ELD viscometer, 1° 34' cone rotor, 10 rpm and under a temperature of 20° C.

Further, in order to impart a preferable three-dimensional handwriting, a writing instrument such as an ink-free ball-point pen and the like provided with a pen tip is used. And in more detail, the present invention relates to the writing instrument provided with a pen tip and an ink tube, containing either an ink composition of an aqueous ink composition in which an adhesive synthetic resin emulsion is contained in 30% by weight on the basis of a solid content with respect to the total amount of the ink as a three-dimensional film-forming content or an ink composition of various embodiments of the present invention which were already mentioned in the above mentioned ink tube, wherein said pen tip unit is composed of a tip body for a writing instrument having a passage through which an ink flows and a valve which controls the ink flow in a tip body, and the flowage amount of said ink from the pen tip is at least 100 mg/10 m.

Therefore, the writing instrument of the present invention has a pen tip unit which is not composed of fiber bundles or resin moldings, but has a passage through which an ink of each kind of embodiments of the present invention flows out and by a valve such as a ball and the like, flowage of said ink is controlled, and the flowage amount of said ink from the pen tip is at least 100 mg/10 m and so, when writing using this writing instrument, a three-dimensional handwriting with a smooth and glossy surface can be formed.

In particular, when a ball-point pen is provided with a pen tip with a ball and an ink tube, in obtaining a further preferable three-dimensional handwriting, such a ball pen is preferable in which an aqueous ink composition is filled in the above mentioned ink tube in which an adhesive synthetic resin emulsion is contained in at least 30% by weight on the basis of the solid content with respect to the total amount of the ink as a three-dimensional film-forming component, and in which the ratio of handwriting thickness Y to ball diameter (diameter) X, that is, handwriting thickness $Y(\mu m) \times 10^3$/ball diameter (mm), or that is, $Y \times 10^3/X(mm)$, is not less than 15, preferably not less than 20, and further preferably, not less than 25.

Further, such a ball-point pen is preferable provided with a pen tip with a ball and an ink tube in which an adhesive synthetic resin emulsion is contained in at least 30% by weight on the basis of the solid content with respect to the total amount of the ink as a three-dimensional film-forming component, and the ratio of flowage amount Z of said aqueous ink composition from said pen tip to said ball diameter (diameter) X, or that is, flowage amount of the ink (mg/10 m)/ball diameter (mm), or that is, Z/X is not less than 125, and preferably, not less than 150, and further preferably, not less than 160.

Further, such a ball-point pen is preferable provided with a pen tip with a ball and an ink tube in which an adhesive synthetic resin emulsion is contained in at least 30% by weight on the basis of a solid content with respect to the total amount of the ink as a three-dimensional film-forming component, and as mentioned above, in which the ratio of handwriting thickness $Y(\mu m) \times 10^3$/ball diameter(mm), or that is, $Y \times 10^3/X(mm)$, is not less than 15 and in which flowage amount of the ink (mg/10 m)/ball diameter (mm), or that is, Z/X is not less than 125.

In order to make handwriting thickness $Y(\mu m) \times 10^3$/ball diameter (mm), or that is, $Y \times 10^3/X(mm)$ not less than 15, for example, such a value can be obtained by regulating an ink component, viscosity and the like, a ball diameter, and the like. The same can be applied in order to make flowage amount of the ink (mg/10 m)/ball diameter (mm), or that is, Z/X not less than 125.

In addition, each upper limit of handwriting thickness $Y(\mu m)$/ball diameter (mm) and flowage amount of the ink (mg/10 m)/ball diameter (mm) is not specifically limited and is appropriately limited depending on a desired three-dimensional degree of handwriting.

As an example of a specific writing instrument preferably feasible for these, such a ball point pen provided with a tip unit for writing instruments and an ink tube connected thereto can be exemplified, wherein an aqueous ink composition comprising at least 30% by weight on the basis of the solid content an adhesive synthetic resin emulsion is stored in said ink tube with respect to the total amount of the ink as a three-dimensional film component, said tip unit for writing instruments including a tip body for writing instruments and a ball for writing instruments, the tip body for writing instruments holding the ball near the distal end thereof, the tip body for writing instruments having a ball housing, a capillary hole, and a proximal hole, the ball housing, the capillary hole, and the proximal hole mutually communicating to form a channel for permitting an ink to flow, the ball housing having a side wall and a ball resting seat holding the ball rotatably and axially movably at a predetermined distance in the ball housing, the tip body for writing instruments further having a broached ink channel or a hole so as to enable the ball housing to communicate with the capillary hole and the proximal hole, the ball housing further having a connecting surface that connects the seat with the side wall and has a truncated conical surface with its apex toward the distal end of the tip unit for writing instruments, and said seat is positioned inside of the connecting surface. Here, the truncated conical surface means a part of an imaginary cone and has the same shape as that of a trapezoidal rotator.

In addition, although it is not limited, said ball-point pen in which a ball urging member which urges said ball from a proximal end toward a distal end is provided in a compressed state inside of a tip unit is preferable.

In addition, although a ball-point pen is specified as one of the aforementioned writing instruments, writing or coating is available by soaking the ink of the present invention in a brush, a stick, and the like.

Figure 2:
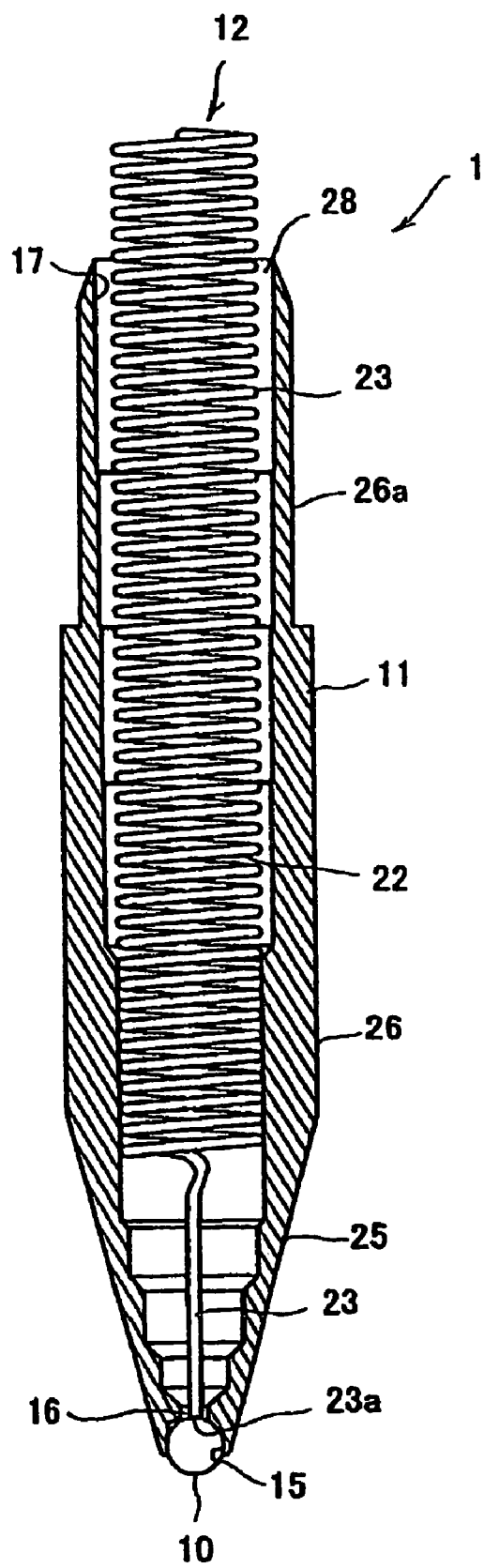
FIG. 2 is a cross-section of said ball-point pen tip unit.
Figure 3:
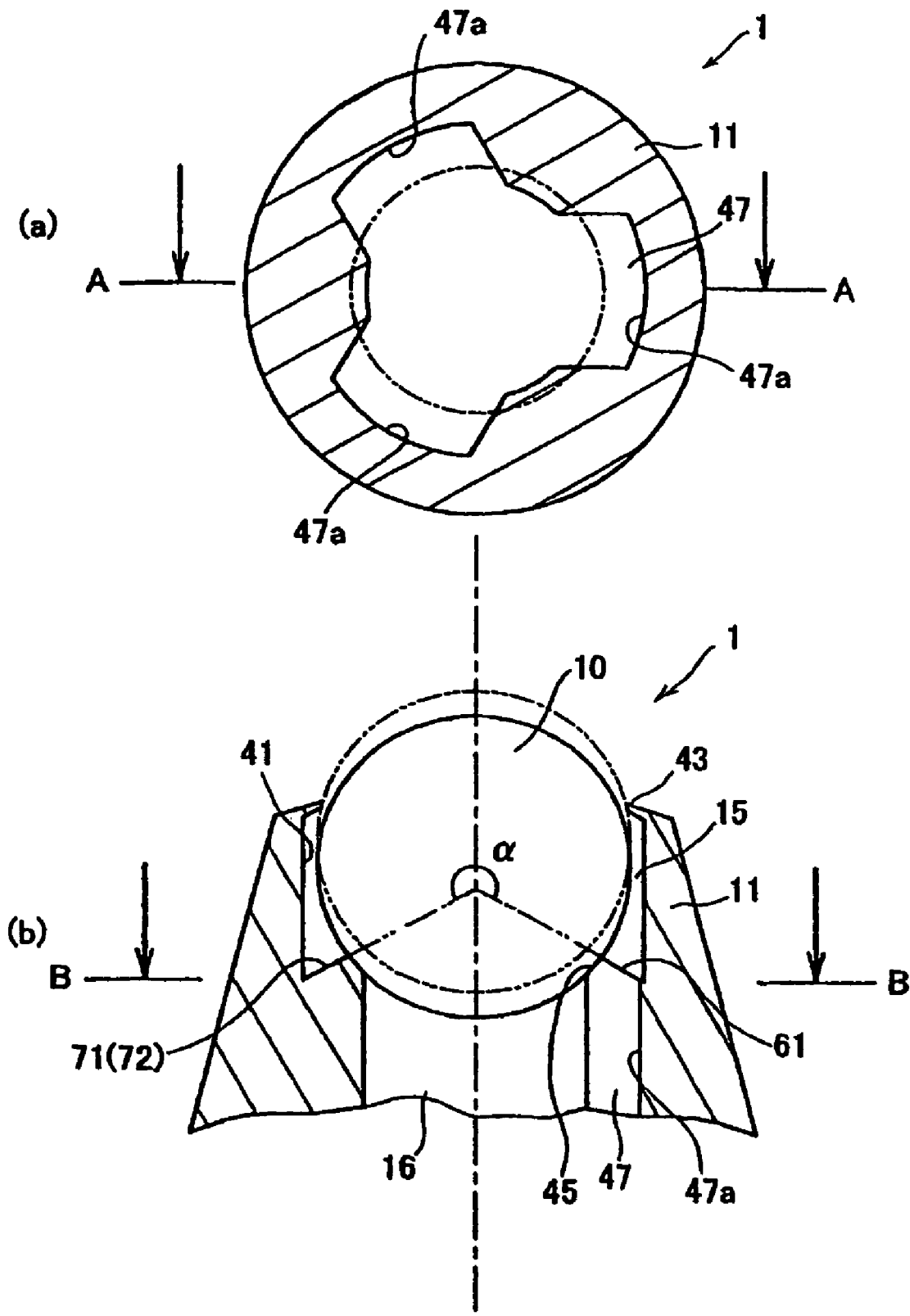
FIG. 3(a) is a cross-section of a distal end of said ball-point pen tip unit.
FIG. 3(b) is a cross-section taken along the line A-A in (a).
Figure 4:
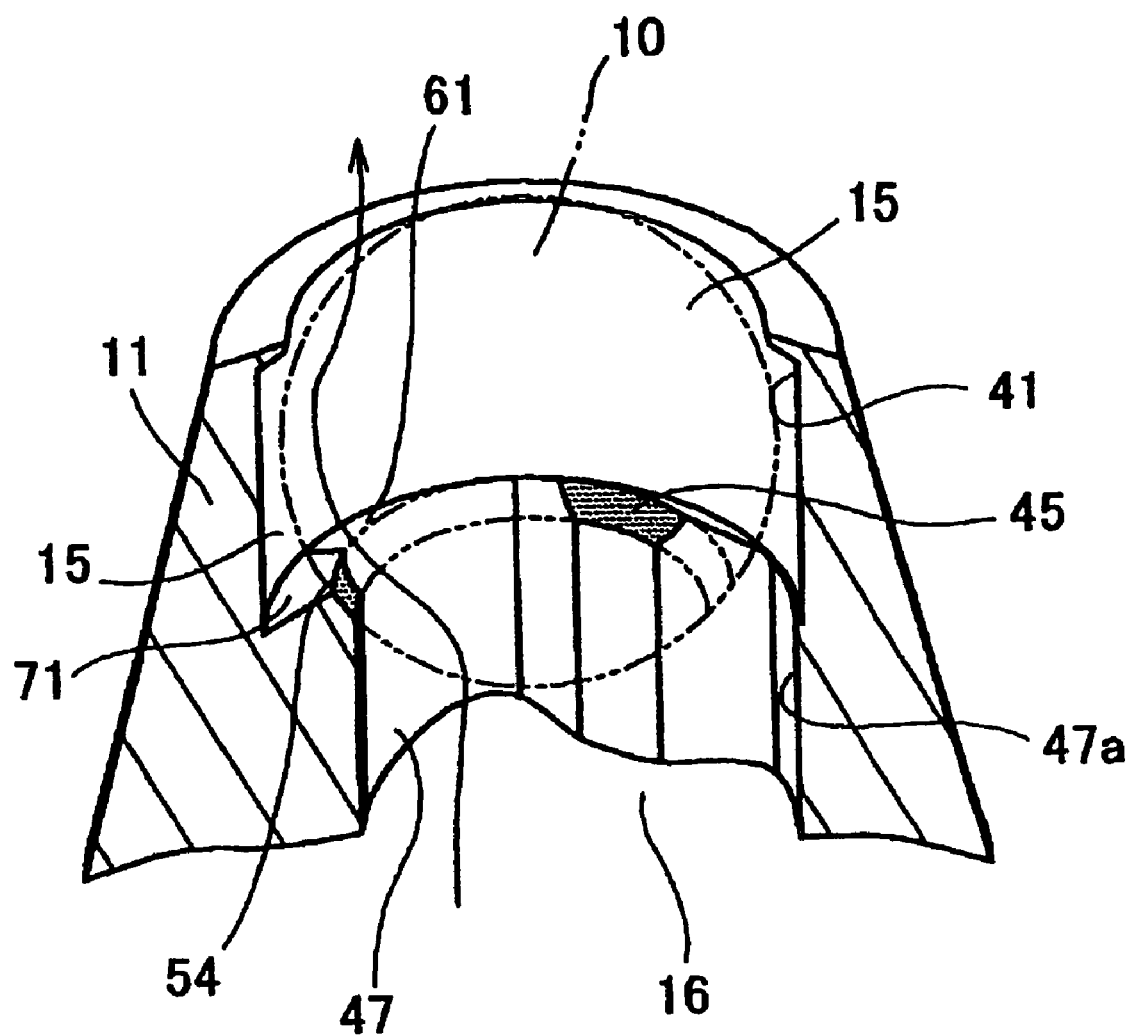
FIG. 4 is a perspective view of a distal end of said ball-point pen tip unit.
Figure 5:
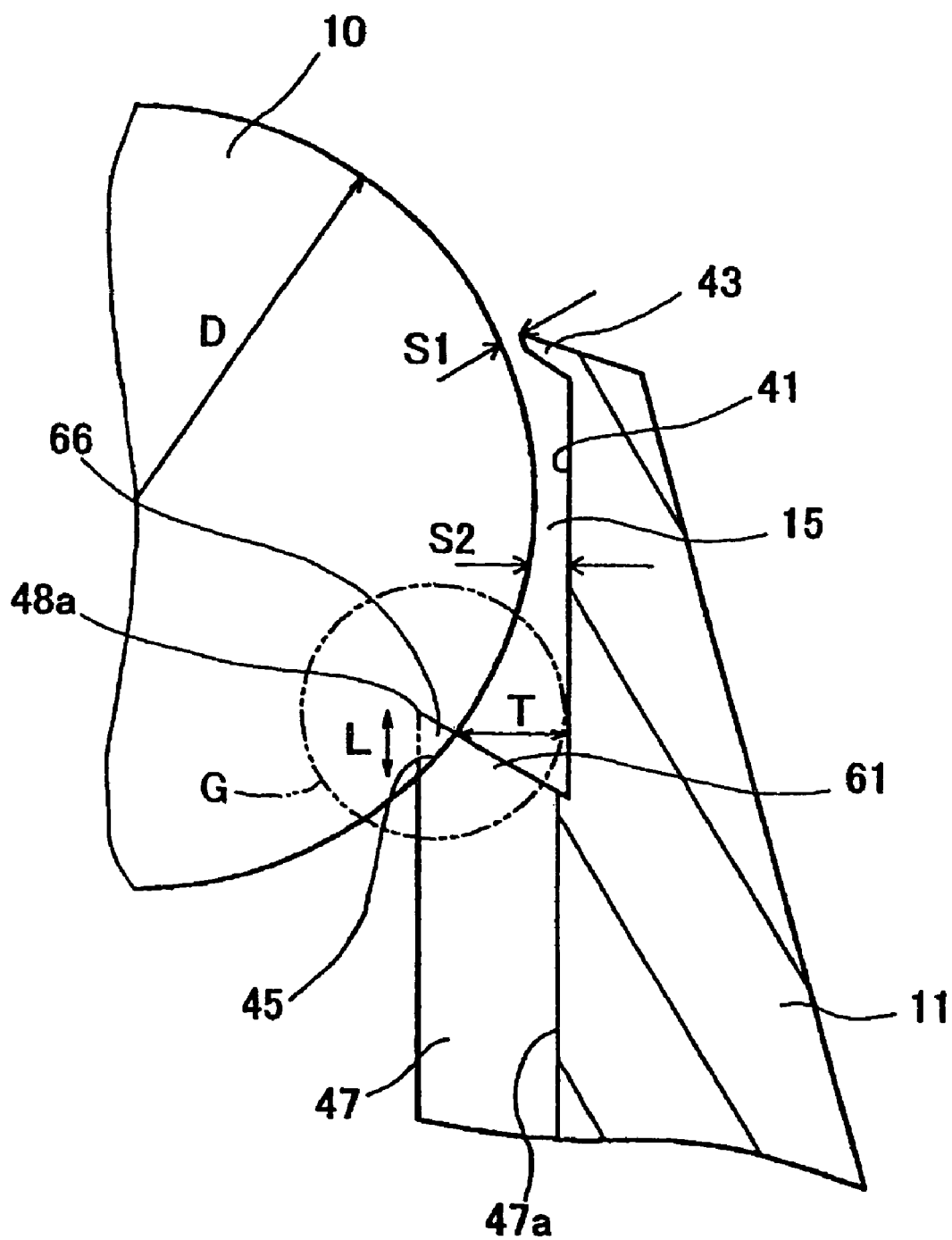
FIG. 5 is a cross-section on an enlarged scale showing a spot where a ball in said ball-point pen tip unit is kept in contact with the tip body of said ball-point pen tip unit.
Figure 6:
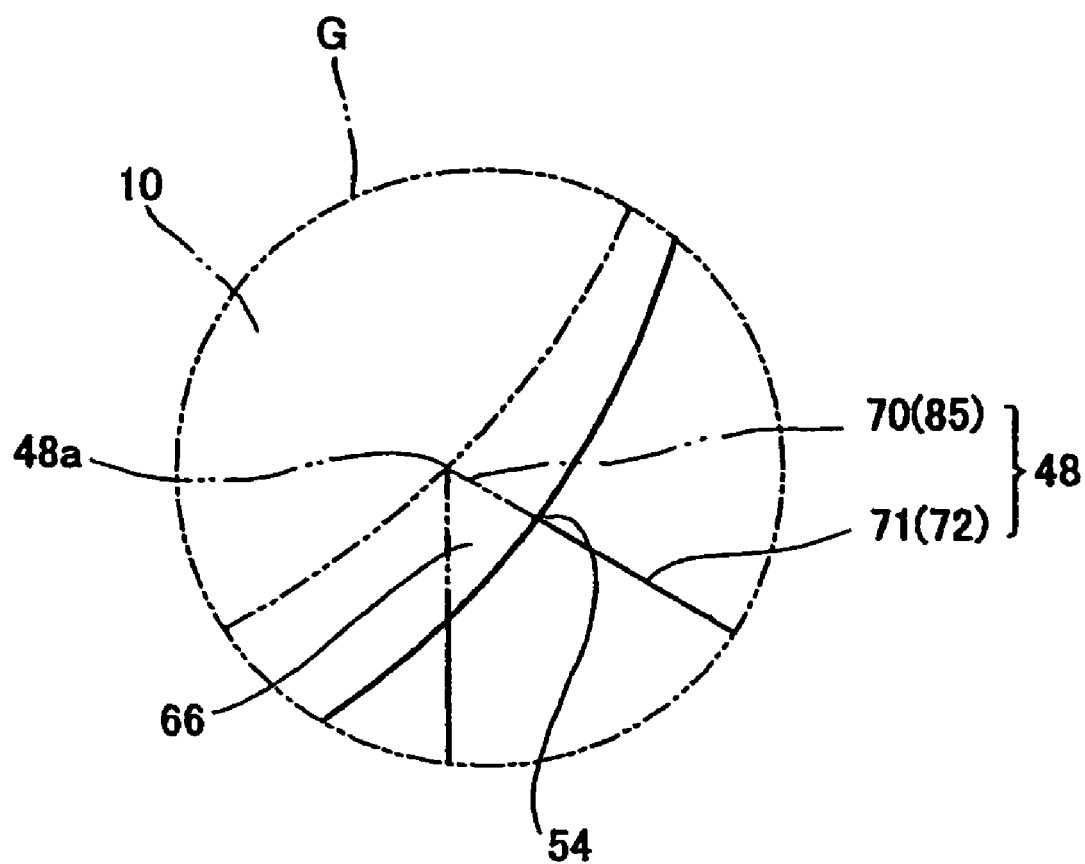
FIG. 6 is an enlarged view of a G portion of FIG. 5.

Hereinafter, one embodiment of said writing instruments is explained further in detail in accordance with figures. FIG. 1 is a cross-section showing a core unit having a tip unit for ball-point pens produced in a first embodiment of the present invention. FIG. 2 is a cross-section of said tip unit for ball-point pens. FIG. 3 (a) is a cross-section showing a distal portion of the tip unit for ball-point pens and (b) is a cross-section taken along the line A-A in FIG. 3 (a). FIG. 4 is a perspective view showing the distal end portion of the tip unit for ball-point pens. FIG. 5 is a cross-section on an enlarged scale showing a spot where a ball in the tip unit is kept in contact with the tip body. FIG. 6 is an enlarged view of a G portion of FIG. 5.

A core unit 7 of a ball-point pen of the first embodiment of the present invention is shown in FIG. 1. Further, at the distal end of the core unit 7, a ball-point pen tip unit 1 (a tip for writing instruments) is attached. In addition, as shown in FIG. 1, a ball-point pen tip unit 1 is communicated with an ink cylinder 6 (a reservoir of the liquid to be applied) containing an ink 5 which is an aqueous ink related to the present invention therein. In addition, the core unit 7 is inserted in a cylindrical shaft (not shown in figures) of the ball-point pen and is used as an aqueous ball-point pen. 51 is an ink follower arranged at a proximal end of an ink in the ink cylinder 6, and according to the present invention, the ink follower is preferably used in a state where silicon oil is gelatinized and more preferably, in a state where silicon oil is gelatinized by benzylidenesorbitol, however, it is not limited thereto. In other words, in the present invention, a gelatinized involatile or a gelatinized refractory organic liquid such as silicon oil, mineral oil, polybutene, and the like are preferably used.

A ball 10 included in the distal end of the ball-point pen tip unit 1 is pushed against a writing surface such as a paper, so that the ink 5 is led out through the ball-point pen tip unit 1 adhering to the ball 10 in appropriate amount, thereby capable of writing.

As shown in FIG. 2, the ball-point pen tip unit 1 includes a ball-point pen tip body 11 (a tip body for writing instruments), a ball 10 and an urging member 12. The tip body 11 and has a substantially conical shape in its distal portion and a substantially cylindrical shape in its proximal portion, entirely appearing to be a rocket. In other words, the tip body 11 has a conically-shaped head 25 at its distal end, and a cylindrical shank 26 at its proximal end. The cylindrical 26 has at its proximal end a connecting step portion 26a whose outside diameter is slightly reduced to be connected to the ink cylinder 6. The tip body 11 includes a ball housing 15, a capillary hole 16, and a proximal hole 17, all of which mutually communicate so as to form a series of flowage of an ink 5. The proximal hole 17 is open in a proximal end opening 28.

As shown in FIGS. 3 and 4, the ball housing 15 includes a side wall 41 having a shape of a cylindrical inner wall, a ball resting seat 45 that is located near the proximal end of the side wall 41, and a connecting surface 71 connecting the seat 45 to the side wall 41. As described below, the seat 45 is formed by tapping, or pressing the ball 10 from the distal end toward the proximal end, so as to be inwardly curved.

The connecting surface 71 has a truncated conical surface with its apex toward the distal end and forming α, an angle at the distal end of a cross-section of this truncated cone of 240°.

Furthermore, as shown in FIGS. 3 and 4, the tip body 11 has broached ink channels 47 axially arranged on its inside wall around the capillary hole 16, cylinder 6 to flow from the capillary hole 16 through the broached ink channels 47 and further outlets 61 of the broached ink channels 47 at the ball housing 15 to the ball housing 15.

The urging member 12 is a coiled spring and is accommodated in the tip body 11 as shown in FIG. 2, and is in a compressed state so as to push the ball 10 from the proximal end toward the distal end. To be specific, a rod-like portion 23 is provided at the distal end and the distal end 23a of the rod-like portion 23 contacts with a ball 10. And when the ball-point pen is not in use, said urging member 12 prevents ink 5 from flowing out, and when the ball-point pen is in use, writing pressure pushes the ball 10 toward the proximal end, thereby facilitating flowage of the ink 5.

The ball 10 is spherical and is accommodated and rotatably held in the ball housing 15 of the tip body 11. More specifically, the ball 10 is supported by the seat 45 at its bottom, by the side wall 41 on its side, and by a deformed edge 43 obtained by pressing the distal end of the side wall 41 of the tip body 11 inwards after the ball 10 being placed into the ball housing 15 as referred to below. As shown in FIG. 5, the ball-point pen tip unit 1 in the present embodiment has gaps T existing against the ball 10 near the outlet 61 of the broached ink channel 47, the gap S2 existing at the spot where the ball 10 is nearest to the sidewall 41 of the ball housing 15, and the gap S1 existing against the ball 10 near the deformed edge 43 of the tip body 11.

And when a ball-point pen 7 is used, the ink 5 flows out from the capillary hole 16 through the gap T of the outlet 61 of the broached ink channels 47 at the ball housing 15 to the ball housing 15, and further flows outside through the gap S1 via the gap S2.

The sizes of the gaps T, S1, and S2 are determined in accordance with the outside diameter D of the ball 10, the deformed amount L, and the inside diameter of the side wall 41 of the ball housing 15.

As the deformed amount L becomes larger, the gap S1 becomes wider, with the consequence of the fact that the distal edge 54 shifts outward, causing a decrease of the gap T with the ball 10 near the outlet 61 of the broached ink channel 47 in accordance with an increase in the deformed amount L. If the deformed amount L is decreased, the gap T becomes wider because of the inward shifting of the distal edge 54, but on the other hand the gap S1 becomes narrower.

In contrast, according to tip unit 1 in the present invention, since the pressure-deformation surface 70 is formed so as to be a truncated conical surface with its apex toward the distal end, the distal edge 54 is placed inward, which leads to a relative increase of the gap T near the outlet 61 of the ball housing 15 of broached ink channel 47. Therefore, more amount of the ink 5 can be discharged since flow age of the already mentioned ink 5 of the present invention can be adjusted to be 100 mg/10 m. Therefore, when writing is made with this, a hand writing with a smooth surface, and glossy and three-dimensional hand writing can be formed.

It is also possible to make the gap S2 where the ball 10 nearest approaches the side wall 41 to be narrower than either of the gaps T and S1 to ensure regulating of flow rate of the ink 5 by restricting excess flow of the ink 5 at the gap S2. That is, the known writing instruments cannot increase both the gaps S1 and T, and therefore, in order to regulate flowage at the gap S2, the gap S2 has to get narrower, thereby preventing an increase of flow rate of liquid. Furthermore, if the flow rate is regulated at the gaps S1 and T, the gaps S1 and T change in size because of the irregularity of the deformed amount L, failing to stably regulate the flow rate. In contrast, the tip unit 1 embodying the present invention can broaden both the gaps S1 and T, and further, the flow rate can be regulated at the gap S2, thereby ensuring precisely regulating flow rate in writing instruments using plenty of liquid effluent therefrom, making the flowage amount of the already mentioned ink 5 of the present invention 100 mg/10 m at least, and forming a hand writing with a smooth surface, and glossy and three-dimensional hand writing.

For information, in FIG. 6, the machined surface 48 includes a pressure-deformation surface 70 deformed by tapping and the connecting surface 71. Referring to FIG. 6, the pressure-deformation surface 70 is tapped to be deformed into the seat 45 under the pressure of the ball 10.

The machined surface 48 has a shape of a truncated conical surface with its apex toward the distal end and a part of an imaginary cone. And the pressure-deformation surface 70 and the connecting surface 71 have a shape of a truncated conical surface with its apex toward the distal end and a part of an imaginary cone, too. The pressure-deformation surface 70 positions in the distal end. And the exterior angle α of the truncated conical surface at the distal end is 240°. In addition, the inner edge 48a of the machined surface 48 terminates at an acute angle.

Further, the pressure-deformation surface 70 is a first surface 85 that is conically shaped with its apex toward the distal end. The connecting surface 71 is a non-pressure surface 72, which is undeformable surface by tapping.

Although methods for producing such writing instruments are not specifically limited, a method of assembling a ball-point pen tip unit 1 as follows is preferable.

For example, first, the tip body 11 is formed.

A solid cylindrical material is used, and the material is cut to produce the distal end of portion of the tip body into a substantially conical shape so as to produce the conically-shaped head 25, thereby forming a predetermined shape (the first process). Next, an inside of the ball housing 15 of the tip body 11 is processed so that it is provided with the side wall having a shape of a cylindrical inner wall and the machined surface 48 extending from the capillary hole edge of the side wall toward the axial center to a capillary hole 16, and in particular, processed so that a pressure-deformation surface 70 has a protruded portion at the distal end (the second process). Next, the broached ink channels 47 are formed thereby processing the tip body 11 (the third process). Next, the ball 10 is contained in the ball housing 15 and the distal end of the tip body 11 is deformed toward the ball 10 (the fourth process). Next, the pressure-deformation surface 70 which is a part of the machined surface 48 is deformed to form the seat 45 by pressing said ball 10 from the distal end to capillary hole 16 (the fifth process). In addition, for example, in said second process, instead of processing the pressure-deformation surface 70 to have a protruded portion at the distal end, the method of processing the pressure-deformation surface 70 to have a first surface which is a shape of a side face of a truncated conical surface with its apex at the distal end of a tip for writing instruments can also be employed.

Figure 7:
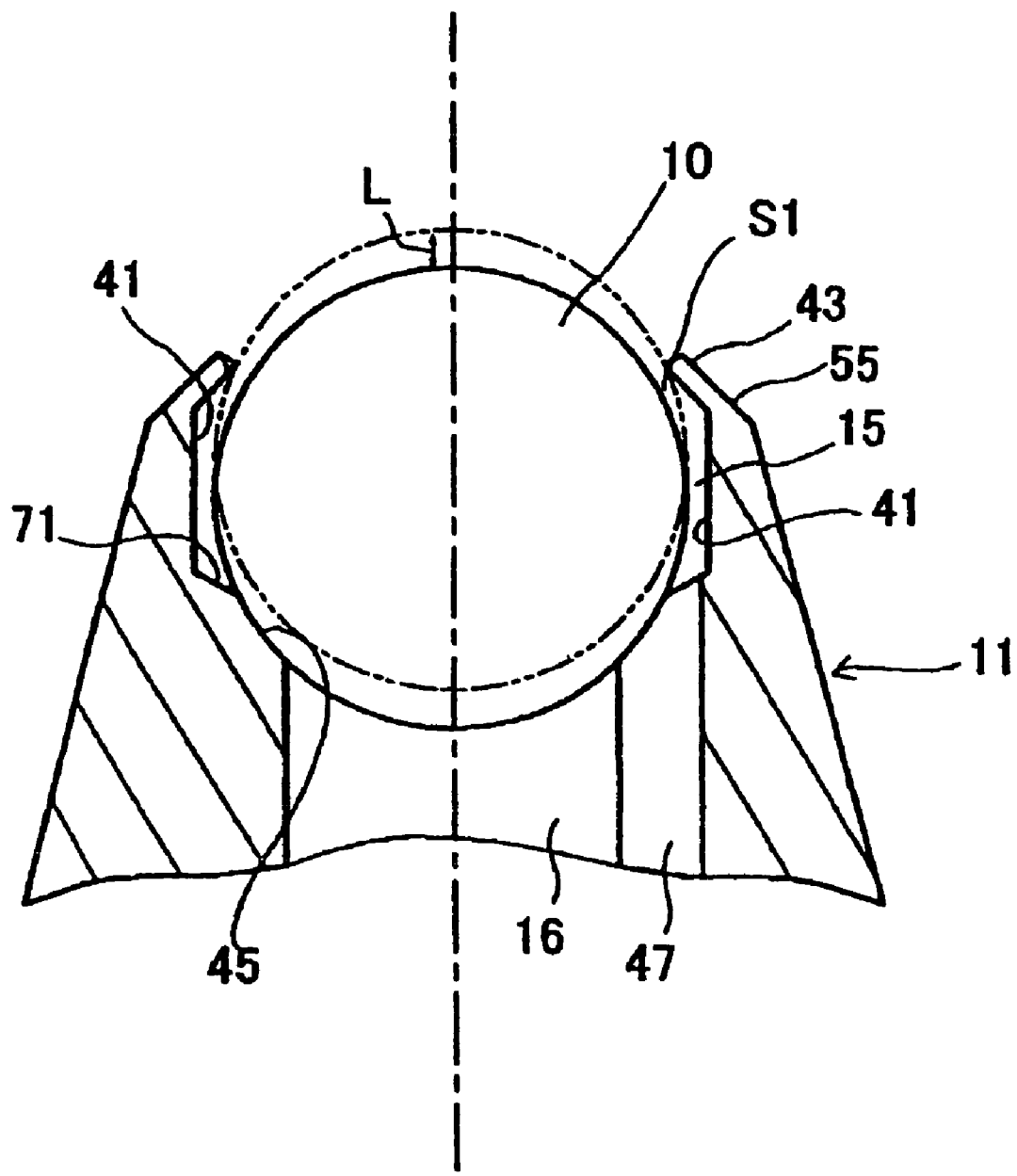
FIG. 7 is a cross-section showing another embodiment of a distal end of a ball-point pen tip unit related to a writing instrument of the present invention.

Also, by the way, in a deformed edge 43 at the distal end of said tip body 11, in order to increase the flowage amount of the ink of the present invention, the structure of the second embodiment as shown in FIG. 7 can be employed.

That is, as shown in FIG. 7, it is the tip unit wherein the tip body 11 is substantially conical shaped, said tip unit has a ball housing 15 whose distal end is aperture like inside of said tip body 11, a ball 10 is contained in said ball housing 15, and a ball is axially movably at a predetermined distance in the ball housing, and by a deformed edge 43 obtained by pressing the distal end of the tip body 11 inwards after the ball 10 being placed into the ball housing 15, wherein the deformed edge 43 of said tip body 11 has outer portion 55 scraped circumferentially and said outer portion is deformed to the ball 10 together with said internal side. Furthermore, as shown in FIG. 7, the tip body 11 has so-called broached ink channels 47 axially arranged around the capillary hole 16. And the broached ink channels 47 are connected to the ball housing 15 and the ink 5 can flow from the capillary hole 16 through the broached ink channels 47 and further outlets 61 of the broached ink channels 47 at the ball housing 15 to the ball housing 15.

The ball 10 is spherical and is accommodated and rotatably held in the ball housing 15 of the tip body 11. That is, the ball 10 is supported by the seat 45 at its bottom, by the side wall 41 on its side, and by a deformed edge 43 obtained by pressing the distal end of the side wall 41 of the tip body 11 inwards after the ball 10 being placed into the ball housing 15. Said ball housing 15 includes a side wall 41 having a shape of a cylindrical inner wall, a ball resting seat 45 that is located near the proximal end of the side wall 41, and a connecting surface 71. The connecting surface 71 is the surface connecting the side wall 41 having a shape of a cylindrical inner wall and the seat 45. The seat 45 is formed by tapping, or pressing the ball 10 from the distal end toward the proximal end. The shape of the connecting surface 71 is a part of an imaginary cone and it is mortar shaped.

In the ball-point pen tip unit 1 of the present embodiment, a ball 10 can move to the proximal end by tapping, and as shown in FIG. 7, the gap S1 is formed between the ball 10 and a deformed edge 43 of the tip body 11. In addition, since the seat 45 is formed by tapping, the whole shape of the seat 45 is in line with a curved surface of the ball 10. And at the time of usage and the like, when the ball 10 is pushed from the distal end to the seat 45, the whole seat 45 contacts with the ball 10. For information, in FIG. 7, L is the deformed amount by tapping which is a distance where the ball is movable by tapping.

Figure 8:
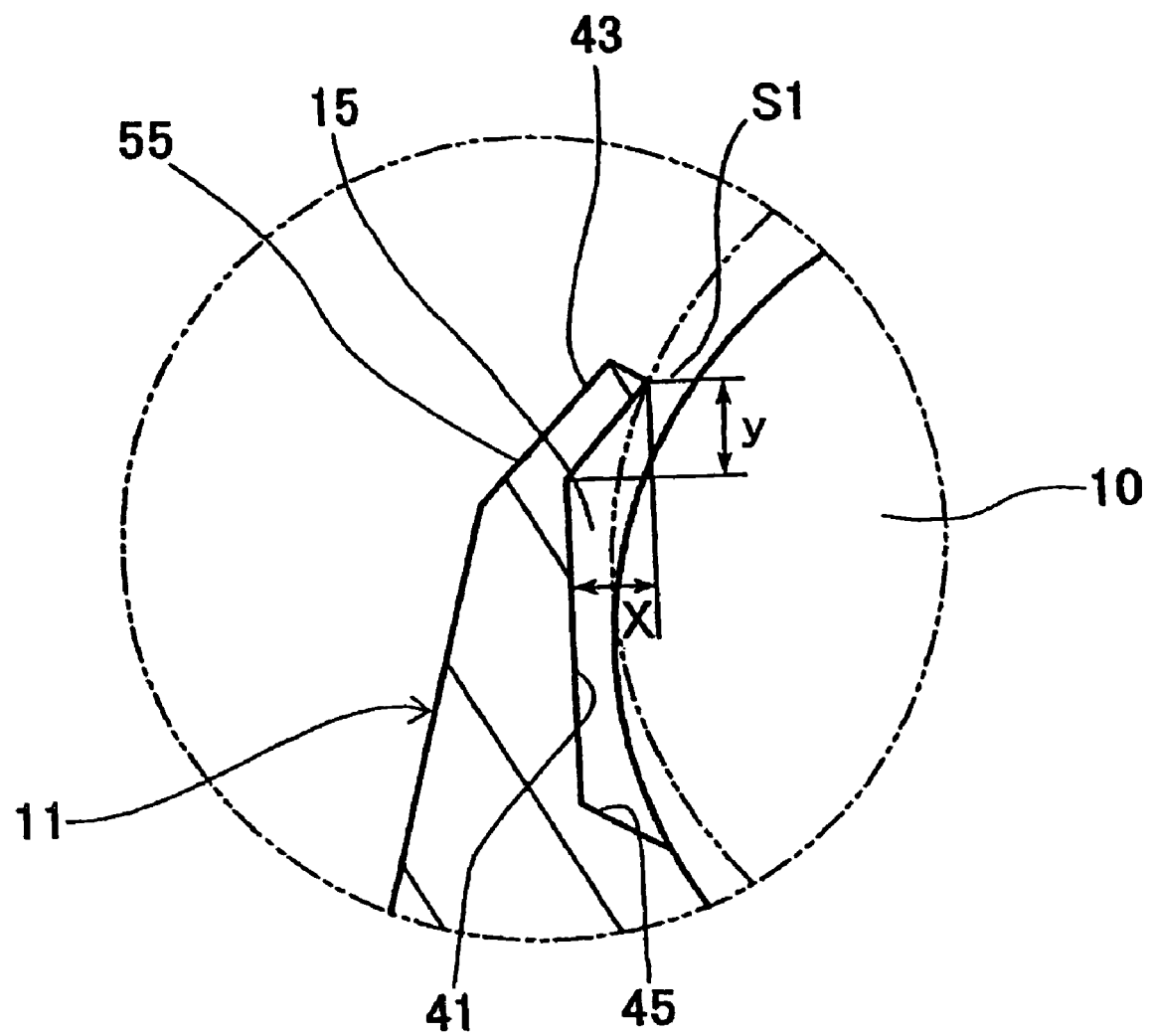
FIG. 8 is an enlarged cross-section of a relevant part thereof.

In order to increase the flowage amount of the ink 5 stably, as shown in FIG. 8, as shown in FIG. 8, it is desirable to have a structure in which internal side of the deformed edge 43 is shortened and inclined as much as possible. In other words, the structure is that length y in the axis direction is made smaller in respect of a distance x in the diameter direction of the deformed edge 43 of a ball-point pen tip unit 1. By taking such a structure, the deformed edge 43 is inclined more to the axis of a ball-point pen tip unit 1. And the deformed edge 43 with the larger inclination allows the space 66 in the ball housing 15, which improves the flowage of the ink 5 at the time of usage.

In order to produce these ball-point pen tips, for example, the outer shape of the tip body 11 is processed to be substantially conical (the first process). Next, in the vicinity of the distal end in the outer side of the tip body 11 is scraped circumferentially and the scraped portion is deformed to the ball side (the second process). Next, the ball housing 15 whose distal side is an aperture is formed in side of a tip body 11 (the third process). Next, a broached ink channel 47 is formed which connects to a capillary hole 16 and is obtained by scraping the wall surface of a capillary hole 16 outward (the fourth process). Next, a deformed edge 43 is provided by containing a ball 10 in said ball housing 15 and by deforming the distal end of the tip body 11 to the ball 10 side (the fifth process). With these series of processes, writing instruments provided with said tips can be produced.

For information, in a ball-point pen tip unit of the above mentioned embodiment, the shape of the first surface of circumferentially scraped outer side portion (circumferentially scraped portion) 55 as already mentioned is a side face of a truncated cone and at the edge portion of the proximal end, an angle is formed. Therefore, when writing with a ball-point pen tip of said embodiment, the edge in the proximal end scratches what is written, thereby generating possibility of deteriorating writing feeling. A ball-point pen tip unit which solves this problem has the curved shape in which the shape of the first surface of the above mentioned circumferentially scraped portion 55 protruding outward. In addition, there is no angle at the edge of the proximal end of the first surface, and the edge of the proximal end portion of the first surface is connected smoothly to form continuous surfaces. Therefore, when writing with a ball-point pen tip produced by a ball-point pen tip unit, there is no concern of scratching and therefore, there is no concern of deteriorating the writing feeling.

For information, although writing instruments which apply the ink of said present invention are not specifically limited, it is desirable to employ the writing instruments with embodiment related to the seat face of said tip and embodiment related to the distal end of said tip selectively or both.

The description of this application claims benefit of priority based on Japan Patent Application No. 2003-149512, No. 2003-149491, and No. 2003-149640, the entire same contents of which are incorporated by reference herein.

EXAMPLES

Inks of Examples and Comparative Examples with compositions shown in tables 1, 2, and 3 were produced. In other words, each component shown in tables 1, 2, and 3 was respectively compounded, followed by stirring by a dissolver for 30 minutes, thereby obtaining inks of Examples and Comparative Examples. For information, in the tables, compounding amount is represented by % by weight and each component is as follows.

(Resin Emulsion)
Nikazol FX555A (manufactured by DAINIPPON INK AND CHEMICALS, INCORPORATED, acrylic, solid content 59.5%)
Nikazol FX138Y (manufactured by NIPPON CARBIDE INDUSTRIES CO., LTD., acrylic, solid content 59.5%)
Nikazol RX242A (manufactured by NIPPON CARBIDE INDUSTRIES CO., LTD., acrylic, solid content 60.0%)
Mowinyl 972 (manufactured by CLARIANT POLYMER CO., LTD., styrene acrylic, solid content 50.0%)
Mowinyl 792 (manufactured by CLARIANT POLYMER CO., LTD., acrylic, solid content 50.0%)
Mowinyl LDM 7520 (manufactured by CLARIANT POLYMER CO., LTD., acrylic, solid content 50.0%)
Bonkote NST 100 (manufactured by NIPPON CARBIDE INDUSTRIES CO., LTD., styrene acrylic, solid content 68%, substance in which two kinds of resin particles with different average particle diameter of 0.1 μm and 0.5 μm are mixed. Average particle diameter in a mixed state is 0.3 μm.) For information, water is included in the above mentioned resin emulsions.

(Colorant)
NKW 6238 (manufactured by NIPPON KEIKO CO., LTD, blue colored fluorescent colorant)
NKW 6007 (manufactured by NIPPON KEIKO CO., LTD, red colored fluorescent colorant)

Next, each of these inks was filled in an ink tube of an aqueous ball-point pen with a structure shown in said FIGS. 1 to 6. A ball is made of silicon carbide and a ball diameter (diameter) is 0.8 mm. In addition, although in Example 12, a ball diameter (diameter) is 0.8 mm, in Example 13, 0.4 mm, and in Comparative Example 4, 0.6 mm, as for others, the same ball-point pen as used in Example 1 was used.

Subsequently, using this writing instrument, writing performance was evaluated. In other words, writing was conducted on PPC paper with the above mentioned pen and a state of a written line was evaluated by visual observation and hand feeling.

(Evaluation Criteria)
Gloss of handwritings: ○: satisfactory gloss is observed.
  Δ: gloss is observed.
  X: glossy feeling is inferior to above mentioned Δ.
Rise of handwritings: ○: rise is recognized by visual observation.
  Δ: rise is recognized by hand feeling.
  X: no rise is recognized by hand feeling.

Measurement of Thickness of Handwritings:

Thickness of written lines written as "KABUSHIKI-GAISHA" on PPC paper was measured by a measuring device whose trade name is "DIAL THICKNESS" (manufactured by TECLOCK CO., LTD.).

With a spiral continuous writing machine whose trade name is "MODEL TS-4C-10" (manufactured by Seiki Manufacturing Co., Ltd), loss (mg) after 10 m of writing was measured. Writing condition is that writing angle of 65°, load of 100 g, and writing speed of 7 cm/sec.

Separation of Perfume in the Ink:

The above mentioned pen filled with an ink of Examples and Comparative Examples including perfume was inverted at a temperature of 70° C. for a day, and separation of the ink in the ink tube was visually observed.

◯: no separation is observed.

X: separation is observed.

Fragrance in a Handwriting Film:

After writing, sensory assessment was made to fragrance from the abovementioned hand writing film. Evaluation was made setting a distance from a handwriting film to nostrils 5 cm.

◯: fragrance is sensed.

X: no fragrance is sensed or fragrance is weak.

TABLE 1

(wt %)

| | | Emulsion property | | | | | | | |
|---|---|---|---|---|---|---|---|---|---|
| | | | Average particle diameter | | | | Examples | | |
| Composition | MFT | | (μm) | 1 | 2 | 3 | 4 | 5 | 6 | 7 |
| Nikazol FX555A | Not more than 0° C. | 0.1 | | | 48.00 | | | | | 48.00 |
| Nikazol FX138Y | Not more than 0° C. | 0.3 | | | | | | | | |
| Nikazol RX242A | 0° C. | 0.1 | | | | | | 65.00 | | |
| Mowinyl 972 | Not less than 100° C. | 0.1 | | | 32.00 | | | | | 32.00 |
| Mowinyl 792 | 13° C. | 0.2 | | | | | | 75.00 | | |
| Mowinyl LDM7520 | 0° C. | 0.1 | | 85.00 | | 85.00 | | | | |
| Bonkote NST100 | 22° C. | 0.1 + 0.5 | | | | | | | 85.00 | |
| NKW-6238 | | | | | | 4.00 | 4.00 | | | |
| NKW-6007 | | | | | | | | 2.00 | 2.00 | 2.00 |
| Texanol | | | | 0.25 | 1.20 | 0.25 | 1.20 | 0.90 | 1.00 | 0.15 |
| Butyl cellosolve | | | | | | | | | | |
| Ion exchange water | | | | Remnant | Remnant | Remnant | Remnant | Remnant | Remnant | Remnant |
| Total amount (wt %) | | | | 100 | 100 | 100 | 100 | 100 | 100 | 100 |
| Property | | | | | | | | | | |
| Resin emulsion amount with respect to the total amount of an ink (in solids, wt. %) | | | | 42.50 | 44.60 | 42.50 | 39.00 | 37.50 | 55.25 | 44.60 |
| Evaluation | | | | | | | | | | |
| Gloss of hand writing | | | | ◯ | ◯ | ◯ | ◯ | ◯ | ◯ | ◯ |
| Rise of hand writing | | | | ◯ | ◯ | ◯ | ◯ | ◯ | ◯ | ◯ |
| Ball diameter (mm) | | | | 0.8 | 0.8 | 0.8 | 0.8 | 0.8 | 0.8 | 0.8 |
| Thickness of handwriting (μm) | | | | 35 | 20 | 30 | 35 | 20 | 35 | 35 |
| Flowage (mg/10 m) | | | | 210 | 220 | 240 | 280 | 200 | 170 | 210 |
| Particle diameter of resin particles composing resin emulsions (nm) | | | | 150 | — | — | — | — | — | — |
| Hand writing thickness Y (μm) × $10^3$/ ball diameter X (mm) | | | | 44 | 25 | 38 | 44 | 25 | 44 | 44 |
| Flowage amount (mg/10 m)/ ball diameter (mm) | | | | 263 | 275 | 300 | 350 | 250 | 213 | 263 |

(wt %)

| | | Emulsion property | | | | | | | |
|---|---|---|---|---|---|---|---|---|---|
| | | | Average particle diameter | | | | Examples | | |
| Composition | MFT | | (μm) | 8 | 9 | 10 | 11 | 12 | 13 |
| Nikazol FX555A | Not more than 0° C. | 0.1 | | | | | | 48.00 | |
| Nikazol FX138Y | Not more than 0° C. | 0.3 | | 54.00 | | | | | |
| Nikazol RX242A | 0° C. | 0.1 | | | | | | | |
| Mowinyl 972 | Not less than 100° C. | 0.1 | | 36.00 | | | | | 32.00 |

TABLE 1-continued

| Composition | MFT | Avg particle diameter (μm) | 1 | 2 | 3 | 4 | 5 | 6 |
|---|---|---|---|---|---|---|---|---|
| Mowinyl 792 | 13° C. | 0.2 | | | | | | |
| Mowinyl LDM7520 | 0° C. | 0.1 | | 90.0 | 85.00 | 85.00 | | 85.00 |
| Bonkote NST100 | 22° C. | 0.1 + 0.5 | | | | | | |
| NKW-6238 | | | | | 4.00 | | | 4.00 |
| NKW-6007 | | | 2.00 | | | | | |
| Texanol | | | 0.50 | 0.15 | — | | 1.20 | 0.25 |
| Butyl cellosolve | | | | | — | 1.00 | | |
| Ion exchange water | | | Remnant | Remnant | Remnant | Remnant | Remnant | Remnant |
| Total amount (wt %) | | | 100 | 100 | 100 | 100 | 100 | 100 |
| Property | | | | | | | | |
| Resin emulsion amount with respect to the total amount of an ink (in solids, wt. %) | | | 50.10 | 42.50 | 42.50 | 42.50 | 44.60 | 42.50 |
| Evaluation | | | | | | | | |
| Gloss of hand writing | | | ○ | ○ | △ | ○ | ○ | ○ |
| Rise of hand writing | | | ○ | ○ | △ | ○ | ○ | △ |
| Ball diameter (mm) | | | 0.8 | 0.8 | 0.8 | 0.8 | 1.0 | 0.4 |
| Thickness of handwriting (μm) | | | 35 | 20 | 15 | 20 | 26 | 8 |
| Flowage (mg/10 m) | | | 210 | 130 | 150 | 180 | 264 | 90 |
| Particle diameter of resin particles composing resin emulsions (nm) | | | — | — | — | — | — | — |
| Hand writing thickness Y (μm) × $10^3$/ ball diameter X (mm) | | | 44 | 25 | 19 | 25 | 26 | 20 |
| Flowage amount (mg/10 m)/ ball diameter (mm) | | | 263 | 163 | 188 | 225 | 264 | 225 |

TABLE 2

| | | | | | | (wt %) |
|---|---|---|---|---|---|---|
| | Emulsion property | | | | | |
| Composition | MFT | Average particle diameter (μm) | Comparative Examples | | | |
| | | | 1 | 2 | 3 | 4 |
| Nikazol FX555A | Not greater than 0° C. | 0.1 | | | | |
| Nikazol FX138Y | Not greater than 0° C. | 0.3 | | | | |
| Nikazol RX242A | 0° C. | 0.1 | | 35.00 | | |
| Mowinyl 972 | Not less than 100° C. | 0.1 | | | | |
| Mowinyl 792 | 13° C. | 0.2 | | | | |
| Mowinyl LDM7520 | 0° C. | 0.1 | 50.00 | | 90.00 | 50.00 |
| Bonkote NST100 | 22° C. | 0.1 + 0.5 | | | | |
| NKW-6238 | | | | | 4.00 | |
| NKW-6007 | | | | | | |
| Texanol | | | 0.25 | 0.00 | 0.25 | 0.25 |
| Butyl cellosolve | | | | | | |
| Ion exchange water | | | Remnant | Remnant | Remnant | Remnant |
| Total amount (wt %) | | | 100 | 100 | 100 | 100 |
| Property | | | | | | |
| Resin emulsion amount with respect to the total amount of an ink (in solids, wt %) | | | 25.00 | 21.00 | 42.50 | 25.00 |
| Evaluation | | | | | | |
| Gloss of handwriting | | | ○ | X | ○ | ○ |
| Rise of handwriting | | | X | X | X | X |
| Ball diameter (mm) | | | 0.8 | 0.8 | 0.8 | 0.6 |
| Handwriting thickness (μm) | | | 10 | 10 | 10 | 7 |
| Flowage amount (mg/10 m) | | | 210 | 200 | 80 | 158 |
| Particle diameter of resin particles composing resin emulsion (nm) | | | — | — | — | — |
| Handwriting thickness Y (μm) × $10^3$/ ball diameter X (mm) | | | 13 | 13 | 13 | 12 |
| Flowage amount (mg/10 m)/ ball diameter (mm) | | | 263 | 250 | 100 | 263 |

TABLE 3

(wt %)

| Composition | MFT | Emulsion property Average particle diameter (μm) | Examples | | | | | | | Comparative Examples | | |
|---|---|---|---|---|---|---|---|---|---|---|---|---|
| | | | 14 | 15 | 16 | 17 | 18 | 19 | 20 | 5 | 6 | 7 |
| Mowinyl LDM7520 | 0° C. | 0.1 | 80.00 | 80.00 | 80.00 | 80.00 | 80.00 | 60.00 | 80.00 | 80.00 | 60.00 | 0.00 |
| Texanol | | | 0.250 | 0.250 | | | | 0.250 | 0.250 | 0.250 | 0.250 | 0.250 |
| Perfume Lavender NS-F5246 | | | 5.00 | | | | | | | | | |
| Lemon NS-G5883 | | | | 1.00 | 5.00 | 10.00 | 20.00 | 15.00 | | 0.10 | 30.00 | 1.00 |
| Ultramarine NS-G5885 | | | | | | | | | 10.00 | | | |
| Ion exchange water | | | Remnant | Remnant | Remnant | Remnant | Remnant | Remnant | Remnant | Remnant | Remnant | Remnant |
| Total amount (wt %) | | | 100.00 | 100.00 | 100.00 | 100.00 | 100.00 | 100.00 | 100.00 | 100.00 | 100.00 | 100.00 |
| Property | | | | | | | | | | | | |
| Resin emulsion amount with respect to the total amount of an ink (in solids, wt %) | | | 40.00 | 40.00 | 40.00 | 40.00 | 40.00 | 30.00 | 40.00 | 40.00 | 30.00 | — |
| Weight ratio of (resin emulsion in solids):(perfume) | | | 20:1 | 40:1 | 20:1 | 4:1 | 2:1 | 2:1 | 4:1 | 400:1 | 1:1 | — |
| Evaluation | | | | | | | | | | | | |
| Gloss of hand writing | | | ○ | ○ | △ | △ | △ | ○ | ○ | ○ | ○ | X |
| Rise of hand writing | | | ○ | ○ | △ | △ | △ | ○ | ○ | ○ | ○ | X |
| Separation | | | ○ | ○ | ○ | ○ | ○ | ○ | ○ | ○ | X | X |
| Perfume | | | ○ | ○ | ○ | ○ | ○ | ○ | ○ | X | ○ | ○ |

From Tables 1, 2, and 3, it is found that in Comparative Examples 1 and 2 in which an adhesive synthetic resin emulsion is contained in less than 30% by weight on the basis of the solid content as a three-dimensional film forming component, the degree of rise in handwritings is not satisfactory and three-dimensional hand writings are not obtained. In addition, when ball-point pens in the Examples with a hand writing thickness (μm)×10³/ball diameter(mm), or Y×10³/X of not less than 15 or ink flowage amount (mg/10 m)/ball diameter (mm), or Z/X of not less than 125 are used, rise of hand writings is obtained, however, when ball-point pens in the Comparative Examples with a handwriting thickness (μm)× 10³/ball diameter (mm), or Y×10³/X of less than 15 or ink flowage amount (mg/10 m)/ball diameter (mm), or Z/X of less than 125 are used, rise of handwritings is not found in any ball-point pen. On the other hand, the inks in each Example with said ink flowage amount out of the pen tip of at least 100 mg/10 m and with said synthetic resin emulsion on the basis of the solid content of not less than 30% by weight, rise of handwritings is good in any Example and preferable three-dimensional handwritings are obtained. In addition, since the inks of the present Examples do not use a light weight fine particle filler, glossy three-dimensional hand writings are formed.

Further, as shown in Table 3, in the inks of Examples 14 to 20 which include Lavender NS-F5246, Lemon NS-G5883, and Ultramarine NS-G5885 as perfumes, when written, the formation of a three-dimensional handwriting film which emits fragrance of a lavender was acknowledged with the ink flowage amount of 210(mg/10 m) and a handwriting thickness of 35 (μm) in Example 14 which include Lavender NS-F5246, the formation of a three-dimensional handwriting film which emits fragrance of a lemon was acknowledged in Examples 15 to 19 which include Lemon NS-G5883, and the formation of a three-dimensional handwriting film which emits fragrance of Aquamarine (perfume) was acknowledged in Example 18 which includes Ultramarine NS-G5885.

When a particle diameter of a resin particle of a resin emulsion was measured, the diameter in Example 1 was 150 nm which included no perfume, however, in the ink of Example 14 which is the same as Example 1 except that perfume was included, the diameter in Example 14 was 170 nm. From this, it was acknowledged that perfume was taken in a resin particle in an emulsion. In the Examples 15 to 20, by perfume taken in a resin particle, enlargement of a particle diameter of said resin particle is acknowledged likewise.

For information, to confirm whether perfume is taken in or not, a particle diameter of a resin particle in a resin emulsion of the present invention was measured by a laser particle size analyzer "LPA3100" manufactured by OTSUKA ELECTRONICS CO., LTD under the measurement condition of a dynamic light scattering method. In addition, a particle diameter shows an average particle diameter of distribution of intensity of scattering.

In addition, it is also acknowledged that the incorporation ratio of a resin emulsion (on the basis of the solid content) and perfume is preferably 2:1 to 40:1 by weight, or the weight ratio of a resin emulsion B (on the basis of the solid content) to perfume A (A/B) is preferably 0.025 to 0.5. In the Comparative Example 2 in which the weight ratio of a resin emulsion (on the basis of the solid content) and perfume is 2:1, or, in which perfume is included in excess of 0.5 in said weight ratio (A/B), it was acknowledged that perfume separated off in a handwriting film. In Comparative Example 1 in which the weight ratio of a resin emulsion (on the basis of the solid content) and perfumes is 40:1, or in which said weight ratio (A/B) of perfume is less than 0.025, the fragrance was weak.

INDUSTRIAL APPLICABILITY

As heretofore mentioned, since the aqueous ink composition of the present invention comprises at least a three-dimensional film-forming component and water, comprises an adhesive synthetic resin emulsion as a three-dimensional film-forming component, and comprises at least 30% by weight of said adhesive synthetic resin emulsion on the basis of the solid content, it can form a three-dimensional handwriting without compounding a lightweight fine particle filler. In particular, by applying this ink to a ball-point pen in which handwriting thickness Y (μm)×10³/ball diameter X (mm), that is, Y×10³/X (mm) is not less than 15, or in which flowage amount of the ink (mg/10 m)/ball diameter (mm), that is, Z/X is not less than 125 and in which the flowage amount of said ink out of said pen tip is at least 100 mg/10 m, it can be utilized as a writing instrument forming a three-dimensional handwriting film. Therefore, since it can form a three-dimensional handwriting film, other than for writing or drawing to paper, nails, bodies, and the like, it can be applied for cosmetic compositions for nails, faces, bodies, and the like which have not been found heretofore.

What is claimed:

1. A ball-point pen provided with a pen tip and an ink tube, wherein an aqueous ink composition is stored in the ink tube, the aqueous ink composition comprising:
   a three-dimensional film-forming component,
   film-forming assistant, the film-forming assistant being included in the aqueous ink composition in an amount of 0.01 to 3% by weight with respect to the total amount of the aqueous ink composition,
   and water, wherein
   the three-dimensional film-forming component is an adhesive synthetic resin emulsion,
   the adhesive synthetic resin emulsion (1) has a minimum film-forming temperature (MFT) that is not greater than 25° C., (2) is included in an amount of at least 30% by weight on the basis of the solid content with respect to the total amount of the aqueous ink composition, and (3) is at least one selected from the group consisting of acrylic synthetic resin emulsion and styrene acrylic synthetic resin emulsion, and
   the aqueous ink composition has an ink viscosity that is not less than 5 mPa·s to less than 100 mPa·s (ELD viscometer, 1° 34' cone rotor, 10 rpm, 20° C.).

2. The ball-point pen as set forth in claim 1, wherein the aqueous composition further comprises a colorant.

3. The ball-point pen as set forth in claim 2, wherein the aoueous ink composition contains a pigment including metal as the colorant, and further comprises a thickening agent.

4. The ball-point pen as set forth in claim 1, wherein resin particles of said emulsion are composed of a plurality of resin particle groups, wherein each resin particle group has different average particle diameters, wherein the plurality of resin particle groups have a plurality of resin particle size distributions, and wherein among said plurality of resin particle groups, the resin particle group having the minimum average particle diameter has an average particle diameter that is within the range of 0.07 to 0.3 μm.

5. The ball-point pen as set forth in claim 4, wherein among said plurality of resin particle groups, said group having the maximum average particle diameter has an avenge particle diameter that is within the range of 0.3 to 1.0 μm.

6. The ball-point pen as set forth in claim 1, wherein the adhesive synthetic resin which has minimum film-forming temperature (MFT) of not greater than 25° C. is a mixture of adhesive synthetic resin emulsions, the mixture including a first adhesive synthetic resin emulsion which has minimum film-forming temperature (MFT) of not greater than 5° C. and a second adhesive synthetic resin emulsion which has minimum film-forming temperature (MFT) of not less than 50° C.

7. The ball-point pen as set forth in claim 6, wherein a mixture ratio (A/B) of the second adhesive synthetic resin emulsion (A) within the mixture to the first adhesive synthetic resin emulsion (B) within the mixture is in a range of 1:4 to 4:1.

8. The ball-point pen as set forth in claim 1, wherein the film-forming assistant is at least one selected from the group consisting of texanol, butyl cellosolve, carbitol, butyl carbitol acetate, and dibutylphthalate.

9. The ball-point pen as set forth in claim 1, wherein the aqueous composition further includes perfume.

10. The ball-point pen as set forth in claim 9, wherein the aqueous composition includes the resin particles of said adhesive synthetic resin emulsion in which said perfume is taken.

11. The ball-point pen as set forth in claim 9, wherein a weight ratio of a solid content of said adhesive synthetic resin emulsion and said perfume is 2:1 to 40:1.

12. The ball-point pen as set forth in claim 1, wherein an ink follower is arranged at the proximal end of the ink tube.

13. The ball-point pen as set forth in claim 12, wherein said ink follower is composed of a gelatinized substance of an involatile or refractory organic liquid.

14. The ball-point pen as set forth in claim 13, wherein said involatile or refractory organic liquid is at least one selected from the group consisting of silicon oil, mineral oil, and polybutene.

15. A ball-point pen provided with a pen tip and an ink tube, wherein an aqueous ink composition is stored in the ink tube, and the flowage amount of said ink out of said pen tip is at least 100 mg/10 m, the aqueous ink composition comprising:
   a three-dimensional film-forming component,
   a film-forming assistant, the film-forming assistant being included in the aqueous ink composition in an amount of 0.01 to 3% by weight with respect to the total amount of the aqueous ink composition,
   and water, wherein
   the three-dimensional film-forming component is an adhesive synthetic resin emulsion,
   the adhesive synthetic resin emulsion (1) has a minimum film-forming temperature (MFT) that is not greater than 25° C., (2) is included in an amount of at least 30% by weight on the basis of the solid content with respect to the total amount of the aqueous ink composition, and (3) is at least one selected from the croup consisting of acrylic synthetic resin emulsion and styrene acrylic synthetic resin emulsion, and
   the aqueous ink composition has an ink viscosity that is not less than 5 mPa·s to less than 100 mPa·s (ELD viscometer, 1° 34' cone rotor, 10 rpm, 20° C.).

16. A ball-point pen provided with a pen tip with a ball and an ink tube, wherein an aqueous ink composition is stored in the ink tube, and Y×10³/X, which is the ratio of handwriting thickness Y (μm) formed by said aqueous ink composition to a diameter X (mm) of the ball, is not less than 15, the aqueous ink composition comprising:
   a three-dimensional film-forming component,
   a film-forming assistant, the film-forming assistant being included in the aqueous ink composition in an amount of 0.01 to 3% by weight with respect to the total amount of the aqueous ink composition,
   and water, wherein
   the three-dimensional film-forming component is an adhesive synthetic resin emulsion,
   the adhesive synthetic resin emulsion (1) has a minimum film-forming temperature (MFT) that is not greater than 25° C., (2) is included in an amount of at least 30% by weight on the basis of the solid content with respect to the total amount of the aqueous ink composition, and (3)

is at least one selected from the group consisting of acrylic synthetic resin emulsion and styrene acrylic synthetic resin emulsion, and the aqueous ink composition has an ink viscosity that is not less than 5 mPa·s to less than 100 mPa·s (ELD viscometer, 1° 34' cone rotor, 10 rpm, 20° C.).

17. A ball-point pen provided with a pen tip with a ball and an ink tube, wherein an aqueous ink composition is stored in the ink tube, and Z/X, which is the ratio of flowage amount Z (mg/10 m) of the ink composition out of said pen tip to a diameter X (mm) of the ball, is not less than 125, the aqueous ink composition comprising:

a three-dimensional film-forming component, a film-forming assistant, the film-forming assistant being included in the aqueous ink composition in an amount of 0.01 to 3% by weight with respect to the total amount of the aqueous ink composition, and water, wherein the three-dimensional film-forming component is an adhesive synthetic resin emulsion, the adhesive synthetic resin emulsion (1) has a minimum film-forming temperature (MFT) that is not greater than 25° C., (2) is included in an amount of at least 30% by weight on the basis of the solid content with respect to the total amount of the aqueous ink composition, and (3) is at least one selected from the group consisting of acrylic synthetic resin emulsion and styrene acrylic synthetic resin emulsion, and the aqueous ink composition has an ink viscosity that is not less than 5 mPa·s to less than 100 mPa·s (ELD viscometer, 1° 34' cone rotor, 10 rpm, 20° C.).

18. A ball-point pen provided with a pen tip with a ball and an ink tube, wherein an aqueous ink composition is stored in the ink tube, and $Y \times 10^3/X$, which is the ratio of handwriting thickness Y (μm) to a diameter X (mm) of the ball, is not less than 15 and Z/X, which is the ratio of flowage amount Z (mg/10 m) to a diameter X (mm) of the ball, is not less than 125, the aqueous ink composition comprising:

a three-dimensional film-forming component, a film-forming assistant, the film-forming assistant being included in the aqueous ink composition in an amount of 0.01 to 3% by weight with respect to the total amount of the aqueous ink composition, and water, wherein the three-dimensional film-forming component is an adhesive synthetic resin emulsion, the adhesive synthetic resin emulsion (1) has a minimum film-forming temperature (MFT) that is not greater than 25° C., (2) is included in an amount of at least 30% by weight on the basis of the solid content with respect to the total amount of the aqueous ink composition, and (3) is at least one selected from the group consisting of acrylic synthetic resin emulsion and styrene acrylic synthetic resin emulsion, and the aqueous ink composition has an ink viscosity that is not less than 5 mPa·s to less than 100 mPa·s (ELD viscometer, 1° 34' cone rotor, 10 rpm, 20° C.).

\* \* \* \* \*